United States Patent
Gaides et al.

(10) Patent No.: US 9,804,311 B2
(45) Date of Patent: *Oct. 31, 2017

(54) HIGHER TRANSMISSION LIGHT CONTROL FILM COMPRISING A TRANSMISSIVE REGION AND AN ABSORPTIVE REGION EACH HAVING A DIFFERENT INDEX OF REFRACTION

(71) Applicant: 3M INNOVATIVE PROPERTIES COMPANY, St. Paul, MN (US)

(72) Inventors: Gary E. Gaides, Woodbury, MN (US); Kenneth A. Epstein, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,033

(22) Filed: Apr. 6, 2016

(65) Prior Publication Data

US 2016/0216420 A1    Jul. 28, 2016

Related U.S. Application Data

(62) Division of application No. 12/682,640, filed as application No. PCT/US2008/079725 on Oct. 13, 2008, now Pat. No. 9,335,449.

(Continued)

(51) Int. Cl.
*G02B 5/30* (2006.01)
*G02B 5/02* (2006.01)

(52) U.S. Cl.
CPC ............. *G02B 5/30* (2013.01); *G02B 5/0263* (2013.01); *G02B 5/3066* (2013.01)

(58) Field of Classification Search
CPC ....... G02B 5/30; G02B 5/0263; G02B 5/3066
See application file for complete search history.

(56) References Cited

U.S. PATENT DOCUMENTS

| 4,267,814 A | 5/1981 | Benson et al. |
| 4,576,850 A | 3/1986 | Martens |

(Continued)

FOREIGN PATENT DOCUMENTS

| JP | 2003-066206 | 3/2003 |
| JP | 2004-012918 | 1/2004 |

(Continued)

OTHER PUBLICATIONS

Evans et al., "Fabricating Diamond Microtools with Focused Ion Beam Machining", *Proceedings of the Euspen International Conference*, Zurich (May 2008); 5 pp.

(Continued)

*Primary Examiner* — Paul Lee
(74) *Attorney, Agent, or Firm* — Daniel J. Iden

(57) ABSTRACT

A light control film, and light collimating assemblies and liquid crystal displays incorporating such light control films are described. The light control film includes alternating transmissive and absorptive regions, where the refractive index of each transmissive region is greater than the refractive index of each absorptive region. The absorptive regions form interfaces at angles that are close to the perpendicular to the light control film. A portion of the incident light intercepting the absorptive region undergoes Total Internal Reflection, and is transmitted through the film. The axial brightness of light passing through the film is increased, the brightness is more uniform within the viewing angle, and the viewing cutoff angle is sharpened.

12 Claims, 6 Drawing Sheets

Related U.S. Application Data

(60) Provisional application No. 60/980,205, filed on Oct. 16, 2007.

(56) References Cited

U.S. PATENT DOCUMENTS

| | | | |
|---|---|---|---|
| 4,605,283 A | 8/1986 | Stanton | |
| 4,621,898 A | 11/1986 | Cohen | |
| 4,766,023 A | 8/1988 | Lu | |
| 5,022,797 A | 6/1991 | Sawa et al. | |
| 5,204,160 A | 4/1993 | Rouser | |
| 5,254,388 A | 10/1993 | Melby et al. | |
| 5,462,700 A | 10/1995 | Beeson et al. | |
| 5,481,385 A | 1/1996 | Zimmerman et al. | |
| 5,486,949 A | 1/1996 | Schrenk et al. | |
| 5,612,820 A | 3/1997 | Schrenk et al. | |
| 5,768,014 A | 6/1998 | Lee | |
| 5,783,120 A | 7/1998 | Ouderkirk et al. | |
| 5,825,543 A | 10/1998 | Ouderkirk et al. | |
| 5,828,488 A | 10/1998 | Ouderkirk et al. | |
| 5,839,823 A | 11/1998 | Hou et al. | |
| 5,882,774 A | 3/1999 | Jonza et al. | |
| 6,111,696 A | 8/2000 | Allen et al. | |
| 6,297,908 B1 | 10/2001 | Suga | |
| 6,353,204 B1 | 3/2002 | Spaay et al. | |
| 6,398,370 B1 | 6/2002 | Chiu et al. | |
| 6,417,966 B1 | 7/2002 | Moshrefzadeh et al. | |
| 6,473,320 B2 | 10/2002 | Randazzo | |
| 6,636,355 B2 | 10/2003 | Moshrefzadeh et al. | |
| 6,768,852 B2 | 7/2004 | Zhang | |
| 6,822,792 B2 | 11/2004 | Goto | |
| 6,905,219 B2 | 6/2005 | Gaides | |
| 7,057,810 B2 | 6/2006 | Thomas et al. | |
| 7,180,210 B1 | 2/2007 | Jorgenson et al. | |
| 7,180,664 B2 | 2/2007 | Goto | |
| 7,184,210 B2 | 2/2007 | Thomas et al. | |
| 7,271,955 B2 | 9/2007 | Osawa et al. | |
| 7,686,463 B2 | 3/2010 | Goto | |
| 7,835,078 B2 | 11/2010 | Ichikawa et al. | |
| 8,012,567 B2 | 9/2011 | Gaides et al. | |
| 8,013,807 B2 | 9/2011 | Cha et al. | |
| 8,213,082 B2 * | 7/2012 | Gaides | G02B 5/045 359/452 |
| 2002/0167725 A1 | 11/2002 | Goto | |
| 2003/0210535 A1 | 11/2003 | Gaides | |
| 2005/0041311 A1 | 2/2005 | Mi et al. | |
| 2005/0140846 A1 | 6/2005 | Lubart et al. | |
| 2005/0213245 A1 * | 9/2005 | Katsura | G02B 5/021 359/443 |
| 2006/0103779 A1 | 5/2006 | Amemiya et al. | |
| 2006/0104084 A1 * | 5/2006 | Amemiya | G02B 5/003 362/561 |
| 2006/0145578 A1 | 7/2006 | Park et al. | |
| 2006/0210726 A1 | 9/2006 | Jones et al. | |
| 2006/0245060 A1 * | 11/2006 | Goto | G02B 5/003 359/613 |
| 2007/0139397 A1 | 6/2007 | Cross | |
| 2007/0153377 A1 * | 7/2007 | Goto | G02B 5/045 359/460 |
| 2007/0160811 A1 * | 7/2007 | Gaides | C08F 290/06 428/172 |
| 2007/0268427 A1 | 11/2007 | Uehara | |
| 2007/0268586 A1 | 11/2007 | Mimura et al. | |
| 2009/0213593 A1 | 8/2009 | Foley et al. | |
| 2009/0284836 A1 | 11/2009 | Boyd et al. | |
| 2010/0201242 A1 | 8/2010 | Liu et al. | |
| 2010/0328777 A1 | 12/2010 | Kashiwagi | |

FOREIGN PATENT DOCUMENTS

| | | |
|---|---|---|
| JP | 2004-062084 | 2/2004 |
| JP | 2005-338270 | 8/2005 |
| JP | 2006-084876 | 3/2006 |
| JP | 2006-085050 | 3/2006 |
| JP | 2007-030095 | 2/2007 |
| KR | 10-0753591 | 8/2007 |
| KR | 10-2008-0038778 | 5/2008 |

OTHER PUBLICATIONS

Evans et al., "Fabricating Diamond Microtools with Focused Ion Beam Machining", Presentation Slides from *Proceedings of the Euspen International Conference*, Zurich (May 2008); 11 pp.

* cited by examiner

HIGHER TRANSMISSION LIGHT CONTROL FILM COMPRISING A TRANSMISSIVE REGION AND AN ABSORPTIVE REGION EACH HAVING A DIFFERENT INDEX OF REFRACTION

FIELD OF THE INVENTION

This invention generally relates to light control films and displays incorporating same. In particular, the invention relates to light control films having improved transmission of light.

BACKGROUND

Light control film (LCF), also known as light collimating film, is an optical film that is configured to regulate the transmission of light. Various LCFs are known, and typically include a light transmissive film having a plurality of parallel grooves wherein the grooves are formed of a light-absorbing material.

LCFs can be placed proximate a display surface, image surface, or other surface to be viewed. At normal incidence, (i.e. 0 degree viewing angle) where a viewer is looking at an image through the LCF in a direction that is perpendicular to the film surface, the image is viewable. As the viewing angle increases, the amount of light transmitted through the LCF decreases until a viewing cutoff angle is reached where substantially all the light is blocked by the light-absorbing material and the image is no longer viewable. This can provide privacy to a viewer by blocking observation by others that are outside a typical range of viewing angles.

LCFs can be prepared by molding and ultraviolet radiation curing a polymerizable resin on a polycarbonate substrate. Such LCFs are commercially available from 3M Company, St. Paul, Minn., under the trade designation "3M™ Filters for Notebook Computers and LCD Monitors".

Advances in display technology have resulted in brighter, higher resolution and more energy efficient displays that consumers want. The brightness and resolution of a display can be reduced when an LCF is positioned in front of the display for security or other purposes. It would be desirable to have an LCF which does not reduce the brightness and resolution of a display.

SUMMARY

Generally, the present invention relates to light control films. The present invention also relates to collimated lighting assemblies and displays incorporating collimated lighting assemblies.

In one aspect of the invention, a light control film includes alternating transmissive and absorptive regions located between a light input surface and a light output surface. Each absorptive region includes optically absorptive material selected from a pigment, a dye, or a combination; in one aspect, the material is carbon black pigment. The index of refraction of each transmissive region is greater than the index of refraction of each absorptive region, such that the difference in the refractive indices is not less than 0.005. In one aspect, the difference in the refractive indices is less than 0.1; in another aspect, the difference is between 0.007 and 0.06. A first interface formed between a transmissive region and an adjacent absorptive region defines an interface angle between the first interface and a direction perpendicular to the light output surface, such that the interface angle is not greater than 3 degrees. In one aspect, a second interface formed between the absorptive region and a second adjacent transmissive region forms a second interface angle defined between the second interface and a direction perpendicular to the light output surface such that the second interface angle is not greater than 3 degrees.

In one aspect, light incident to the light input surface exits the light output surface with a maximum brightness in a direction perpendicular to the light output surface, and exits the light output surface at greater than 80% of the maximum brightness measured at any angle less than 10 degrees from the direction perpendicular to the light output surface; in another aspect, measured at any angle less than 20 degrees. In one aspect, the light exits the light output surface at greater than 90% of the maximum brightness measured at any angle less than 10 degrees from the perpendicular; in another aspect, measured at any angle less than 20 degrees.

In one aspect, the light control film includes a polar viewing cutoff angle, and light incident to the light input surface exits the light output surface with a maximum brightness in a direction perpendicular to the light output surface, and exits the light output surface at less than 10% of the maximum brightness measured at any angle greater than the polar viewing cutoff angle; in another aspect, less than 5% of the maximum brightness.

In one aspect of the invention, a collimated lighting assembly includes a light control film and a light source emitting light toward a light input surface of the light control film. The light control film includes a light input surface and transmissive and absorptive regions. The transmissive region having an index of refraction N1, and the absorptive region having an index of refraction N2, where N1-N2 is not less than 0.005. A first interface between the transmissive region and the adjacent absorptive region makes an angle of less than 3 degrees with a direction perpendicular to the input surface. In one aspect, a second interface formed between the transmissive region and a second absorptive region forms a second interface, and the second interface makes an angle of not greater than 3 degrees with a direction perpendicular to the input surface. In one aspect, the collimated lighting assembly can also include a prismatic film, a reflective polarizer, or a combination of a prismatic film and a reflective polarizer. The prismatic film and the reflective polarizer can be placed between the light source and the light control film. The reflective polarizer can be laminated to the light control film. The prismatic film can be positioned between the light source and the reflective polarizer.

In one aspect of the invention, a liquid crystal display includes a light control film, a light source emitting light toward a light input surface of the light control film, and a liquid crystal display module receiving light from a light output surface of the light control film. The light control film includes alternating transmissive and absorptive regions disposed laterally within a plane defined by a light input surface and a light output surface. The light input surface is positioned opposite the light output surface. The index of refraction of each absorptive region is less than an index of refraction of each transmissive region by at least 0.005. A first interface between a transmissive region and a first adjacent absorptive region defines an interface angle $\theta_1$ measured from a direction perpendicular to the plane, wherein $\theta_1$ is not greater than 3 degrees. In one aspect, a second interface formed between the transmissive region and a second absorptive region forms a second interface angle defined between the second interface and a direction perpendicular to the light output surface such that the second interface angle is not greater than 3 degrees.

In one aspect, the liquid crystal display can also include a prismatic film, a reflective polarizer, or a combination of a prismatic film and a reflective polarizer. The prismatic film and the reflective polarizer can be placed between the light source and the light control film. The reflective polarizer can be laminated to the light control film. The prismatic film can be positioned between the light source and the reflective polarizer.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
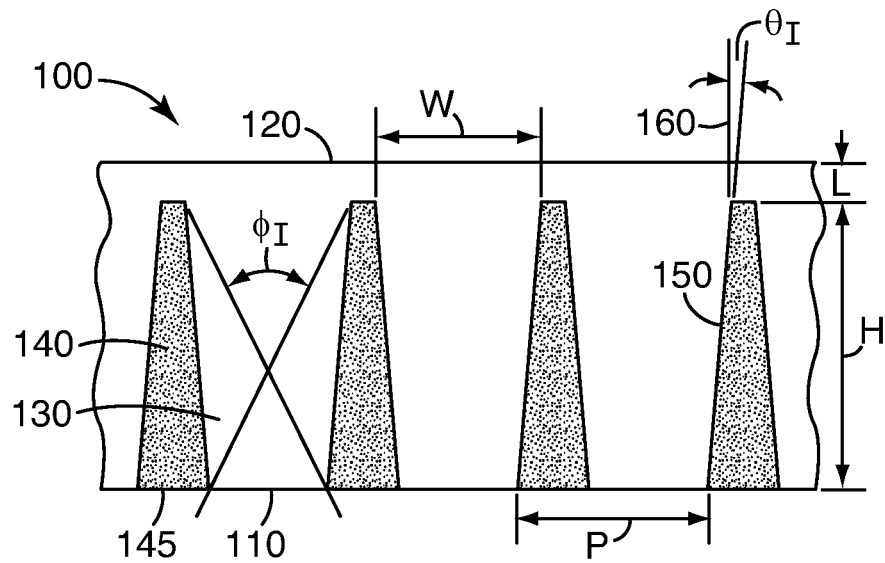
FIG. 1 is a cross-section view of an LCF.

The present application is directed to an LCF having an increased brightness and uniformity of transmitted light while maintaining a well-defined viewing cutoff angle. A portion of the light entering the LCF undergoes Total Internal Reflection (TIR) within the LCF, increasing the amount of light transmitted through the film. In one aspect, the LCF is placed between the light source and an image plane of a backlit display, to improve the display brightness and uniformity, without reducing resolution. The included wall angles and difference of indices of refraction between alternating absorbing and transmitting regions are kept small to accomplish these properties.

LCFs are often made to ensure that the absorptive regions absorb as much of the incident light as possible. Highly absorptive regions minimize the amount of light that may "leak" through these regions, and therefore control the directionality and the privacy function of the LCF. Incident light that is reflected from these absorptive regions is also generally minimized to reduce spurious or "ghost" images that can arise from such reflections. LCFs can be placed between a viewer and an image plane of a display to limit the viewing angle of an image. Image planes can be included, for example, in a Liquid Crystal Display (LCD), a graphics display, and an indicia display. In some cases, LCFs can be used in a projection display, where information in the image plane is projected to a receiving surface.

In one aspect, the relative refractive indices of the absorptive and transmissive regions are adjusted. This adjustment may result in a reduction of ghost images produced by reflections within the LCF. When the refractive index of the transmissive region is less than the refractive index of the absorptive region, light incident to the interface between them is refracted into the absorptive region and absorbed. The refractive indexes of the two regions can be essentially "matched" so that the absorptive region refractive index is slightly higher than (if not equal) to the transmissive region, and reflections are essentially eliminated. Unfortunately, the portion of light which is absorbed reduces the total light transmitted through the LCF, and it is desirable to utilize a portion of this absorbed light, without altering the intended viewing angle One aspect of the present invention is an LCF that is placed on the side of the display image plane which is opposite the viewer (i.e. between a light source used to illuminate the display and the image plane of the display). An LCF so positioned, minimizes the formation of ghost images since the LCF collimates the light into a viewing angle prior to reaching an image plane in the display. In one aspect of the invention, a portion of the light which impinges on the interface between the absorptive and transmissive regions in the LCF reflects from the interface and travels to the display, increasing the brightness (or "gain") of the display within the intended viewing angle. Transmission of light outside of the intended viewing angle is generally not desired. A reflective interface, such as a reflective metal, can cause light to be transmitted outside of the intended viewing angle, and typically is not acceptable.

The brightness of the display can be increased when incident light undergoes TIR from the interface between the absorptive and transmissive regions. Whether a light ray will undergo TIR or not, can be determined from the incidence angle with the interface, and the difference in refractive index of the materials used in the transmissive and absorptive regions. In one aspect of the invention, the refractive index of the absorptive region is no greater than the refractive index of the transmissive region. In some cases, the index of refraction of the transmissive region is greater than the index of refraction of the light absorptive region by at least about 0.005. In some cases, the difference between the indexes is less than 0.1. In some cases, the difference between the indexes is between 0.007 and 0.06. As used herein, "between" two numbers in a range is meant to include the endpoints of the range. For example, "between 0.007 and 0.06" is meant to include the endpoints 0.007 and 0.06, and all numbers between these two endpoints.

In one aspect, the LCF can be placed between the light source and the image display plane (e.g. LCD panel) to improve the performance of displays such as automotive displays or avionics displays. High brightness during daylight conditions is desired for readability; however, the light from the display may produce unwanted reflections at surfaces, such as the front wind screen. Unwanted reflections become more apparent in low ambient light conditions. In one aspect, the brightness of the display is increased and unwanted reflections decreased, since light remains within a controlled viewing angle, FIG. 1 shows a cross-sectional view of an LCF 100 that includes a light output surface 120 and a light input surface 110 opposite light output surface 120. LCF 100 includes alternating transmissive regions 130, absorptive regions 140, and an interface 150 between transmissive regions 130 and absorptive regions 140. Transmissive regions 130 have a base width "W" disposed apart from each other by a pitch "P", and include a land region "L" between absorptive regions 140 and light output surface 120. Absorptive regions 140 have a base 145, a height "H" and are displaced apart from each other by pitch "P". Interface 150 forms an interface angle $\theta_I$ with a normal 160 to light output surface 120. As described herein, by "normal" to a surface is meant perpendicular to the surface. LCF 100 includes an internal viewing cutoff angle $\Phi_I$ defined by the geometry of alternating transmissive regions 130 and absorptive regions 140.

Figure 2:
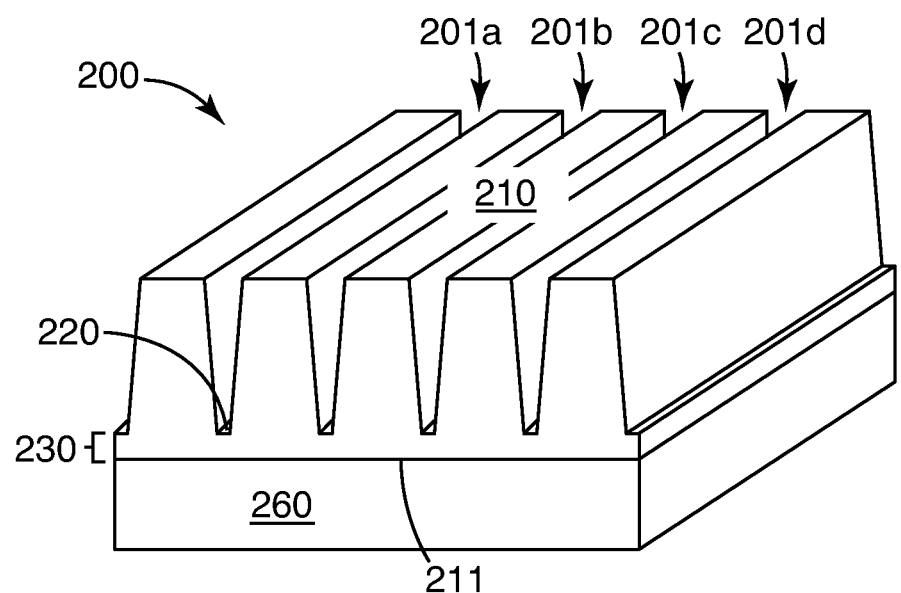
FIG. 2 is a perspective view of a microstructured film article.

FIG. 2 shows a microstructured film article 200 comprising at least one microstructured surface 210, which can be used to make an LCF. In one case, microstructured surface 210 can include a plurality of grooves 201a-201d. As shown in FIG. 2, a continuous land layer 230 can be present between the base of the grooves 220 and the opposing surface 211 of microstructured film article 200. In one case, grooves 220 can extend all the way through the microstructured film article 200. In one case, microstructured film article 200 can include a base substrate layer 260 which can be integrally formed with, or separately added to microstructured film article 200.

Figure 3:
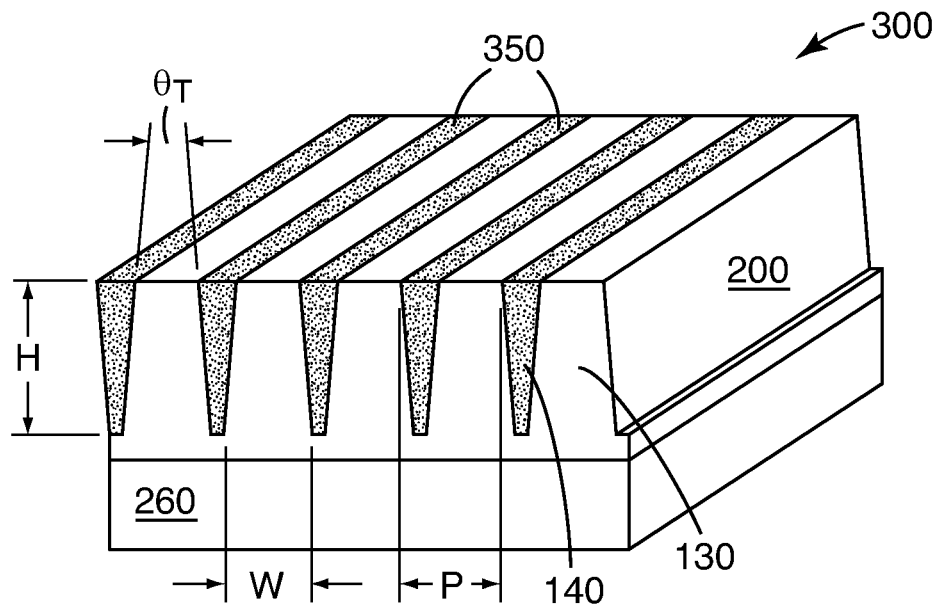
FIG. 3 is a perspective view of an LCF.

FIG. 3 shows an LCF 300 wherein grooves 201a-201d of FIG. 2 have been rendered light-absorbing by being filled with a light absorbing material 350. Light absorbing material 350 in the shape of the recess of the (e.g. groove) microstructure is herein referred to as absorptive region 140.

Figure 4:
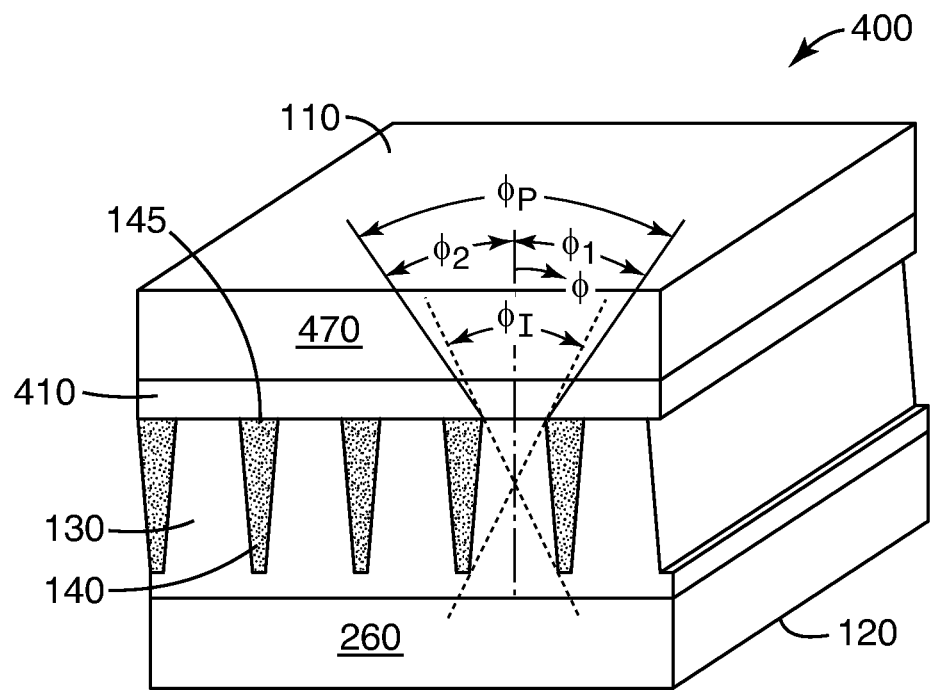
FIG. 4 is a perspective view of an LCF.

FIG. 4 shows an LCF 400 that further includes an optional cover film 470 that can be the same, or different than, base substrate layer 260. Optional cover film 470 can be bonded to the microstructured surface with an adhesive 410. Adhesive 410 can be any optically clear adhesive, such as a UV-curable acrylate adhesive, a transfer adhesive, and the like. LCF 400 also includes light input surface 110 and light output surface 120 opposite light input surface 110, defining a plane. It is to be understood that for the purposes of describing the invention herein, LCF 400 is positioned such that light input surface 110 is disposed proximate to a base 145 of absorptive region 140, however, light input surface 110 can also be disposed opposite base 145. In other words, LCF 400 can be positioned such that base 145 is closer to a light source (not shown) that injects light into light input surface 110, or it can also be positioned such that base 145 is closer to a display plane (not shown) that receives light from light output surface 120.

As shown in FIGS. 3 and 4, transmissive regions 130 between absorptive regions 140 have an included wall angle $\theta_T$, a transmissive region base width "W", an effective height "H", a pitch "P", and a polar viewing cutoff angle $\Phi_P$. Included wall angle $\theta_T$ is two times the interface angle $\theta_I$ shown in FIG. 1 for symmetric absorptive regions. In one case, interface angle $\theta_I$ can be different for each interface 150, and included wall angle $\theta_T$ is equal to the sum of the interface angles $\theta_I$ on each side of absorptive region 140, for an unsymmetrical absorptive region. Polar viewing cutoff angle $\Phi_P$ can be determined by applying Snell's law to the rays defining the internal viewing cutoff angle $\Phi_I$, using the indices of refraction of optional cover film 470, adhesive 410, transmissive regions 130, base substrate layer 260, and the material that LCF 400 is immersed in (typically air). Polar viewing cutoff angle $\Phi_P$ is equal to the sum of a polar viewing cutoff half angle $\Phi_1$ and a polar viewing cutoff half angle $\Phi_2$ each of which are measured from the normal to light input surface 110. In some cases, polar viewing cutoff angle $\Phi_P$ can be symmetric, and polar viewing cutoff half angle $\Phi_1$ is equal to polar viewing cutoff half angle $\Phi_2$. In some cases, polar viewing cutoff angle $\Phi_P$ can be asymmetric, and polar viewing cutoff half angle $\Phi_1$ is not equal to polar viewing cutoff half angle $\Phi_2$. For the purposes of this disclosure, an angle "$\Phi$" shown in FIG. 4 and measured from the normal to light input surface 110 along the direction shown, is herein referred to as a "polar viewing angle". The polar viewing angle $\Phi$ can range from 0° (i.e. normal to light input surface 110) to 90° (i.e. parallel to light input surface 110).

The material properties of transmissive regions 130, included wall angle $\theta_T$, pitch "P", and transmissive region base width "W" can impact light transmission through LCF 400. LCFs can have relatively large included wall angles, such as greater than 10 degrees or more. Larger wall angles increase the width of the light absorbing regions, thereby decreasing transmission at normal incidence. Smaller wall angles are preferred, such as less than 10 degrees, so that the transmission of light at normal incidence can be made as large as possible.

In one aspect, the present invention can be directed to LCFs where the included wall angle can be not greater than 6°. In one aspect, the included wall angle can be not greater than 5°, such as less than 5°, 4°, 3°, 2°, 1° or 0.1°. As described herein, the included wall angle can be related to the interface angle for symmetric and asymmetric absorptive regions. As such, in one aspect, the interface angle can be 3°, or not greater than 3°, for example not greater than 2.5°, 2°, 1°, or 0.1°. Smaller wall angles can form grooves having a relatively high aspect ratio (H/W) at a smaller pitch "P", and can provide a sharper image cutoff at lower viewing angles. In some cases, the transmissive regions have an average height, "H", and an average width at its widest portion, "W", and H/W is at least 1.75. In some cases, H/W is at least 2.0, 2.5, 3.0 or greater.

LCFs can be made to have any desired polar viewing cutoff angle. In one aspect, the polar viewing cutoff angle ranges from 40° to 90° or even higher. The polar viewing cutoff angle $\Phi_P$, can be determined as discussed elsewhere by the parameters "$\theta_I$", "H", "W", "P", and the indices of the LCF materials. In some cases, it can also be useful to define a "functional polar viewing angle" which includes light transmitted through the LCF at angles larger than the polar viewing cutoff angle. For example, light that intercepts the absorptive regions at angles slightly larger than the internal viewing cutoff angle $\Phi_I$ can "bleed through" the thinnest portions of the absorptive region (i.e. partially transmit through the top and bottom of the light absorbing regions represented as trapezoids shown in FIG. 1). The functional polar viewing angle can be defined as the angle at which the brightness decreases to a small percentage, for example 10%, 5% or even less, of the axial brightness.

Figure 5:
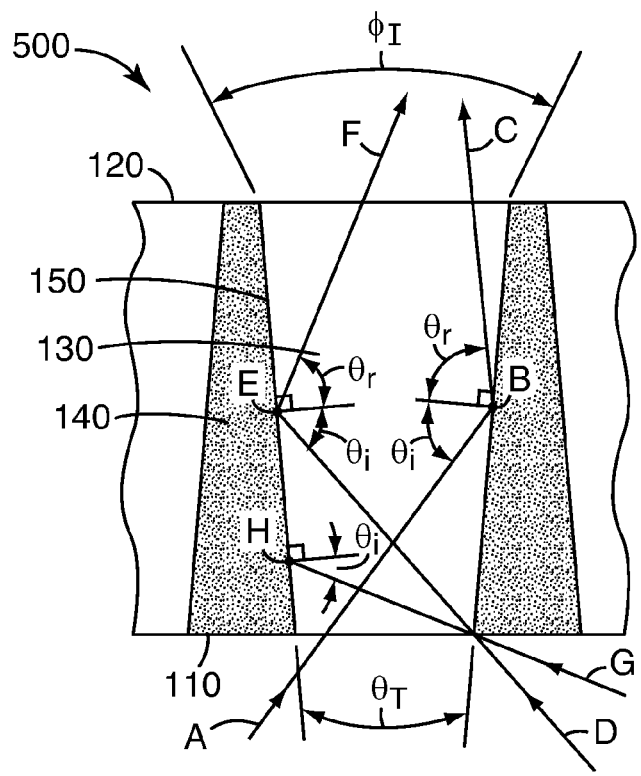
FIG. 5 is a schematic cross-section of an LCF.

FIG. 5 shows an LCF 500 according to one aspect of the present invention. The light transmission of LCF 500 is greater than the light transmission through prior art LCFs, since some of the light impinging on absorptive regions 140 is reflected by TIR. LCF 500 includes transmissive regions 130 comprising a material having index of refraction N1, and absorptive regions 140 comprising a material having an index of refraction N2 which is not greater than N1. The critical angle, $\theta_c$ (not shown) for the interface is $\theta_c$=arcsin (N2/N1). Light rays impinging on interface 150 at angles greater than $\theta_c$, undergo TIR at interface 150. Light rays impinging on interface 150 at angles less than $\theta_c$ are absorbed by absorptive regions 140.

FIG. 5 shows three light rays, ABC, DEF and GH which enter transmissive region 130 through light input surface 110. Light ray ABC enters transmissive region 130 within internal viewing cutoff angle $\Phi_I$, intercepts absorptive region 140 at angle of incidence $\theta_i$ greater than $\theta_c$, and undergoes TIR to exit through light output surface 120. In a similar manner, light ray DEF enters transmissive region 130 outside of internal viewing cutoff angle $\Phi_I$, intercepts absorptive region 140 at angle of incidence $\theta_i$ greater than $\theta_c$, and undergoes TIR to exit through light output surface 120. Light ray GH enters transmissive region 130 outside internal viewing cutoff angle $\Phi_I$, intercepts absorptive region 140 at angle of incidence $\theta_i$ less than $\theta_c$, and is absorbed by absorptive region 140. The included wall angle $\theta_T$, transmissive index N1, and absorptive index N2, are adjustable parameters for control of the transmission of light through light output surface 120. Selection of these parameters can cause some of the light which would otherwise be absorbed by absorptive region 140, to instead be reflected from interface 150 and directed through the output surface within the intended internal viewing cutoff angle $\Phi_I$.

As the index difference between the absorptive regions and the transmissive regions increases, critical angle $\theta_c$ decreases, and more of the light impinging on the interface is reflected from the interface. The LCF has higher brightness (or gain), but can result in the undesired transmission of light through the output surface of the LCF at angles that are larger than the intended viewing cutoff angle. In some cases, it can be desirable to limit the difference in the relative refractive indexes, in order to control these unwanted reflections. In one aspect, the present invention is directed to LCFs comprising materials that have small differences in refractive index, such as between 0.005 and 0.1, and small interface wall angles, such as not greater than 3°, or between 0.1° and 3°.

In some cases, light absorbing materials for the light absorbing regions in LCFs can be any suitable material that functions to absorb or block light at least in a portion of the visible spectrum. In some cases, the light absorbing material can be coated or otherwise provided in grooves or indentations in a light transmissive film to form light absorbing regions. In some cases, light absorbing materials can include a black colorant, such as carbon black. In one embodiment, the carbon black can be a particulate carbon black having a particle size less than 10 microns, for example 1 micron or less. In one embodiment the carbon black can have a mean particle size of less than 1 micron. In some cases, carbon black, another pigment or dye, or combinations thereof can be dispersed in a suitable binder. In some cases, light absorbing materials can include particles or other scattering elements that can function to block light from being transmitted through the light absorbing regions.

In one aspect, the light absorbing region can comprise substantially the same polymerizable resin composition as the light transmissive material. In this embodiment, the refractive index of the light absorbing region material can be no greater than the refractive index of the light transmissive region material. In some cases, the amount of colorant, such as carbon black, is at least about 1 wt-% and no greater than about 10 wt-% of the total light absorbing region material composition. In some cases, from about 2% to about 5% carbon black by weight can be mixed with an absorptive region resin material to sufficiently absorb incident light. The refractive index of carbon black is higher than 1.5, so in some cases, a low refractive index resin can be mixed with the carbon black to maintain a desired refractive index difference between absorptive and transmissive regions.

Reflections at the light transmissive region/light absorbing region interface can be controlled by mismatching the relative index of refraction of the light transmissive material and the index of refraction of the light absorbing material over at least a portion of the spectrum, for example the human visible spectrum. In some cases, the index of refraction of the cured transmissive regions (N1) is greater than the index of refraction of the cured light absorptive regions (N2) by at least about 0.005. In some cases, the index of refraction difference, (N1−N2) is not less than 0.005, or, (N1−N2) is greater than or equal to 0.005. In some cases, the difference between the indexes (N1−N2) can be less than 0.1, and can be between 0.007 and 0.06.

In one aspect, the LCF includes a plurality of light absorbing regions. In some embodiments, the light absorbing regions can be a plurality of channels, as shown elsewhere in the description. In some cases, the LCF can include a plurality of columns such as shown in FIG. 2b of U.S. Pat. No. 6,398,370 (Chiu et al.). In some cases, the LCF described herein can be combined with a second LCF, as also described in U.S. Pat. No. 6,398,370. In other embodiments, the light absorbing regions are columns, posts, pyramids, cones and other structures that can add angular-dependent light transmitting or light blocking capabilities to a film.

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin. In some cases, polymerizable resin compositions useful for the LCF of the present invention can include polymerizable resin compositions such as are described in U.S. Publication No. 2007/0160811 (Gaides et al.), to the extent that those compositions satisfy the index and absorption characteristics herein described.

A microstructure-bearing article (e.g. microstructured film article 200 shown in FIG. 2) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the base film can optionally be primed or otherwise be treated to promote adhesion of the optical layer to the base.

The polymerizable resin compositions described herein are suitable for use in the manufacture of other light transmissive and/or microstructured articles including for example brightness enhancing films and the like. The term "microstructure" is used herein as defined and explained in U.S. Pat. No. 4,576,850 (Martens). Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005, +/−0.1 or, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

The chemical composition and thickness of the base material can depend on the requirements of the product that is being constructed. That is, balancing the needs for strength, clarity, optical retardance, temperature resistance, surface energy, adherence to the optical layer, among others. In some cases, the thickness of the base layer can be at least about 0.025 millimeters (mm) and can be from about 0.1 mm to about 0.5 mm.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base material can contain mixtures or combinations of these materials. In one case, the base may be multi-layered or may contain a dispersed component suspended or dispersed in a continuous phase.

In one aspect, examples of base materials include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN® polycarbonate film 8010, available from GE Polymershapes, Seattle Wash., and Panlite 1151, available from Teijin Kasei, Alpharetta Ga.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. No. 5,825,543 (Ouderkirk et al.); U.S. Pat. No. 5,783,120 (Ouderkirk et al.); U.S. Pat. No. 5,882,774 (Jonza et al.); U.S. Pat. No. 5,612,820 (Shrenk et al.) and U.S. Pat. No. 5,486,949 (Shrenk et al.). The use of these polarizer films in combination with prismatic brightness enhancement film has been described, for example, in U.S. Pat. No. 6,111,696 (Allen et al.) and U.S. Pat. No. 5,828,488 (Ouderkirk et al.). Films available commercially are multilayer reflective polarizer films such as Vikuiti™ Dual Brightness Enhancement Film "DBEF", available from 3M Company.

The base materials listed herein are not exclusive, and as will be appreciated by those of skill in the art, other polarizing and non-polarizing films can also be useful as the base for the optical products of the invention. These base materials can be combined with any number of other films including, for example, polarizing films to form multilayer structures. The thickness of a particular base can also depend on the desired properties of the optical product.

Figure 6:
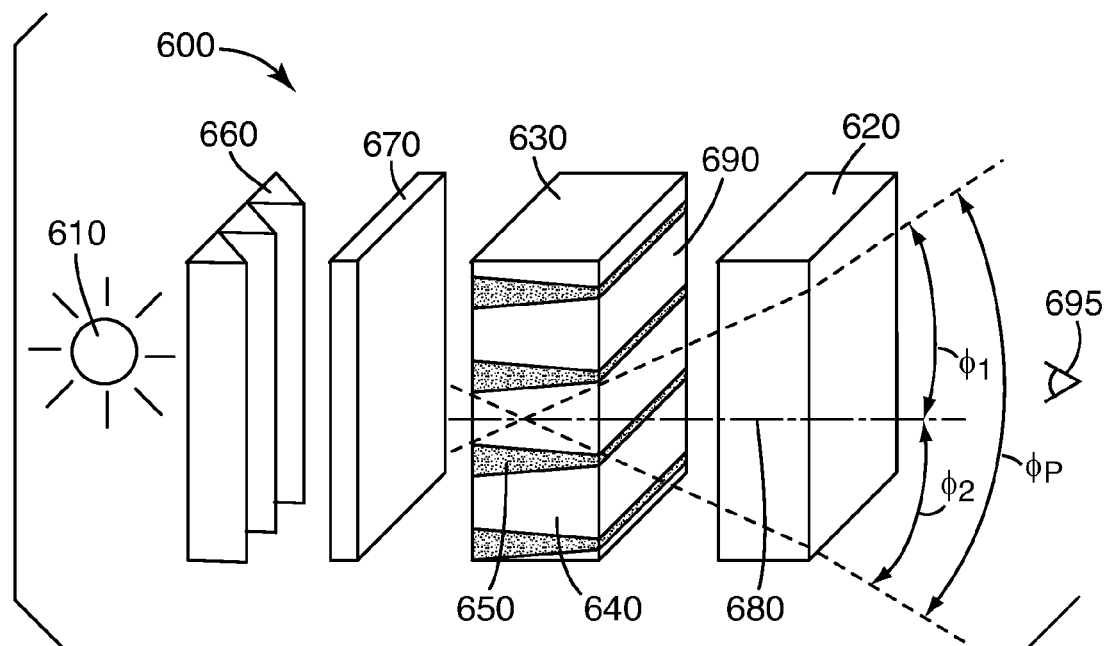
FIG. 6 is a perspective schematic of a backlit display.

FIG. 6 shows a perspective schematic of a backlit display 600 according to one exemplary aspect the present invention. Backlit display 600 includes an LCF 630 to define a polar viewing cutoff angle $\Phi_P$ of light leaving an output surface 690 of LCF 630. Polar viewing cutoff angle $\Phi_P$ includes a polar viewing cutoff half angle $\Phi_1$ and a polar viewing cutoff half angle $\Phi_2$ measured from a normal 680 to light output surface 690, as described elsewhere. LCF 630 includes transmissive regions 640 and absorptive regions 650 as described elsewhere. Backlit display 600 includes a light source 610 configured to transmit light through LCF 630, through an image plane 620, such as an LCD panel, and on to a viewer 695. The viewing angle at which the brightness is a maximum, can depend on whether the polar viewing cutoff angle is symmetric about normal 680 or is asymmetric, as described elsewhere. In one aspect, the brightness of backlit display 600 can be greatest along normal 680 (referred to as the "axial brightness"), and decrease as the viewing angle is increased. For asymmetric polar viewing cutoff angles, the maximum brightness may not be coincident with normal 680. Backlit display 600 can also include an optional brightness enhancement film 660 and a reflective polarizer film 670 to further improve the brightness and uniformity of the display. Brightness enhancement film can be a prism film, such as Vikuiti™ Brightness Enhancement Film "BEF" or Thin Brightness Enhancement Film "TBEF", available from 3M Company. Reflective polarizer film 670 can be a multilayer optical film, such as Vikuiti™ Dual Brightness Enhancement Film "DBEF", available from 3M Company). Brightness enhancement film 660 and reflective polarizer film 670, if included, can be positioned as shown in FIG. 6.

The present invention should not be considered limited to the particular modeling and examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification. The foregoing description can be better understood by consideration of the embodiments shown by the modeling results and examples that follow.

Ray-Trace Modeling of LCF

The performance of the LCF was modeled using an optical raytrace program. The optical raytrace program provides results comparable to public commercial raytrace software, such as TracePro® (available from Lambda Research Corp., Littleton Mass.), and LightTools® (available from Optical Research Associates, Pasadena Calif.).

The optical properties of BEF and LCF were inputs into the program, and the physical dimensions and structures were input as shown below. The absorption coefficient of the black resin was calibrated with the actual attenuation of light incident at 37° of a carbon-filled black photo-polymerizable mixed acrylate resin (substantially the same as the "high index black resin" presented in as Mixture 3 in Table 3). The model corresponded to an arrangement similar to FIG. 6, where light source 610 was a lambertian light source, brightness enhancement film 660 was the Vikuiti™ Brightness Enhancement Film BEF-II design, reflective polarizer film 670 was not used, and LCF 630 was configured as shown in FIG. 4 as LCF 400 (i.e. with 0.1 mm thick polycarbonate cover film 470, 0.1 mm thick polycarbonate base substrate layer 260, and 0.025 mm thick adhesive 410).

Parallel rays at a viewing angle Φ were traced from image plane 620 toward the lambertian light source 610, and the luminance (brightness) was recorded. The process was repeated for viewing angles from 0° to 90° to generate each of the plots. The program accounted for the attenuation by reflection and absorption of the initial ray traversing through the materials and interfaces, until it intercepted the source surface. The attenuation provided a factor for multiplying the surface brightness, and resulted in the brightness at the viewing direction of the initial ray. Plots were generated that show the intensity vs. viewing angle in a plane perpendicular to the film surface and along the groove direction (horizontal plane) and in a plane perpendicular to the film surface and perpendicular to the groove direction (vertical plane). The plots shown in FIGS. 7-9 include data from both viewing directions. The brightness profile in the horizontal plane is labeled "along groove".

TABLE 1

| Model input parameters common to Examples 1-3 | |
|---|---|
| Material, property | Value (units) |
| PC, index | 1.583 |
| PC, absorption coefficient | 0.005 (1/mm) |
| Adhesive, index | 1.52 |
| Adhesive, absorption coefficient | 0 |
| Transmissive region, index | 1.54 |
| Transmissive region, absorption coefficient | 0.005 (1/mm) |
| Absorptive region, absorption coefficient | 129 (1/mm) |
| "H", height of absorptive region | 0.146 mm |
| "L", land thickness | 0.015 mm |
| "P", pitch | 0.070 mm |
| $\Phi_P$, polar viewing cutoff angle | 60 degrees |

Example 1

Model with Interface Wall Angle=0.1°

Figure 7:
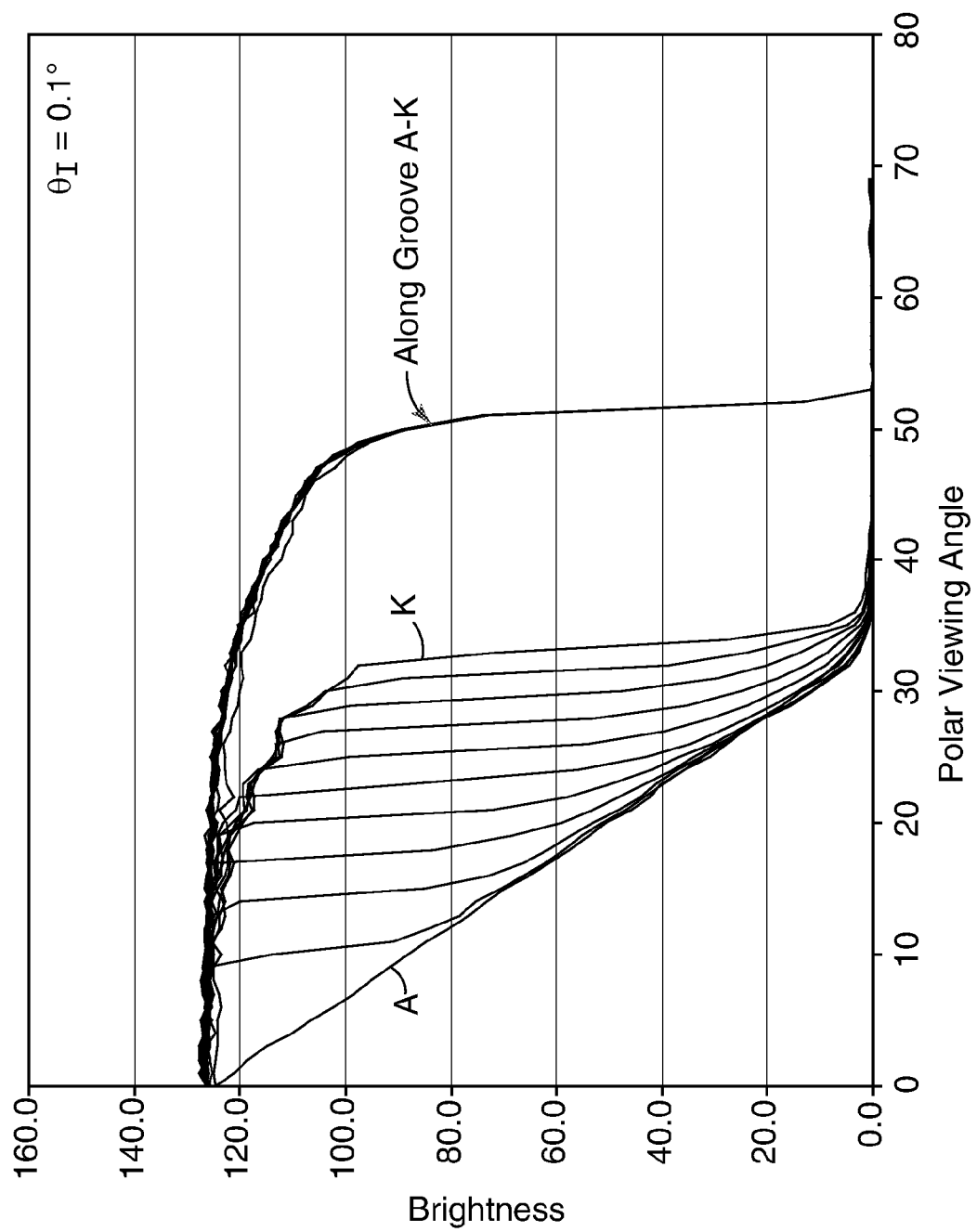
FIG. 7 is a plot of the brightness of an LCF.
Figure 8:
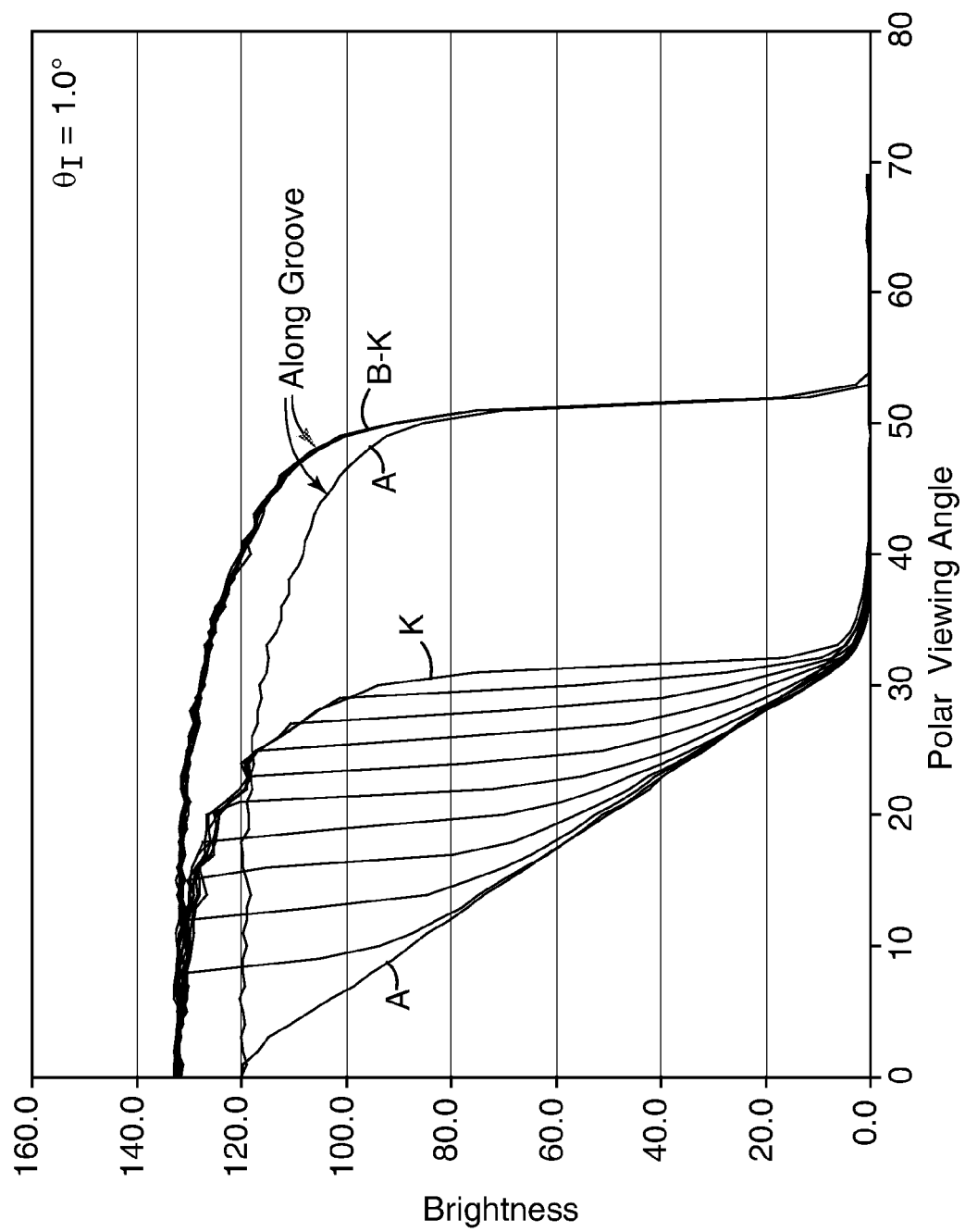
FIG. 8 is a plot of the brightness of another LCF.
Figure 9:
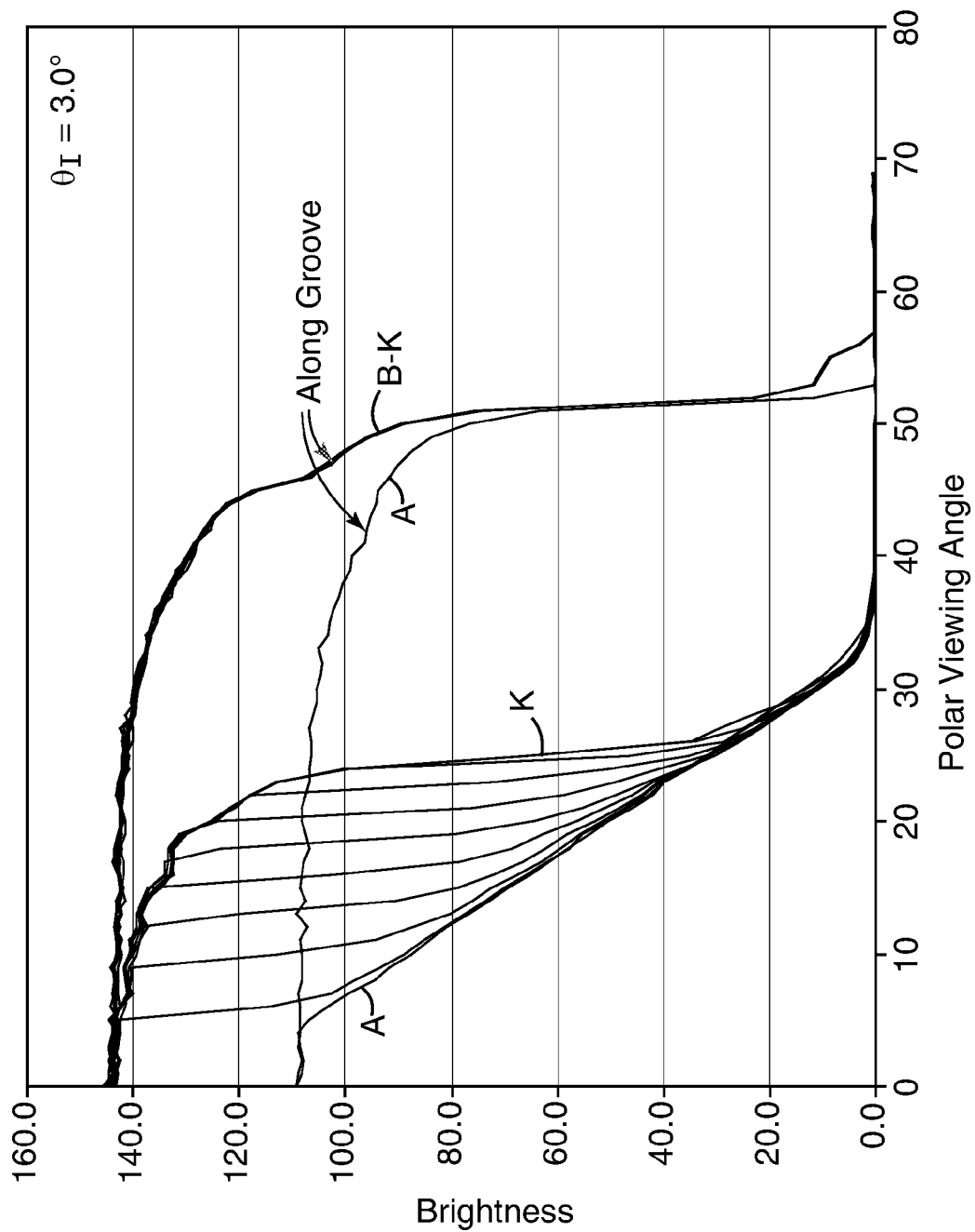
FIG. 9 is a plot of the brightness of another LCF.

The interface wall angle input to the model was set to a value of 0.1°. The resulting width "W" was 0.0523 mm to result in the 60° polar viewing cutoff angle. The index of the absorptive region was set equal to the index of the transmissive region, and the brightness was calculated at several polar viewing angles by the method described elsewhere. The index was decreased by 0.01 and the calculation was repeated until the difference in the indices was 0.1. The brightness values generated the series of plots shown in FIG. 7 for a 0.1° interface wall angle. As shown in FIGS. 7-9, the plot corresponding to matched index values was labeled "A", and the index difference increased by 0.01 increments moving to the right, ending at the index difference 0.1 represented by the plot labeled "K".

Example 2

Model with Interface Wall Angle=1.0°

The same procedure as in Example 1 was used, with the exception that the interface wall angle input to the model was set to a value of 1.0°, and the resulting width "W" was 0.0571 mm to result in the 60° polar viewing cutoff angle. The brightness values generated the series of plots shown in FIG. 8 for a 1.0° interface wall angle.

Example 3

Model with Interface Wall Angle=3.0°

The same procedure as in Example 1 was used, with the exception that the interface wall angle input to the model was set to a value of 3.0°, and the resulting width "W" was 0.0673 mm to result in the 60° polar viewing cutoff angle. The brightness values generated the series of plots shown in FIG. 9 for a 3.0° interface wall angle.

Representative Values for Axial Brightness and Brightness at Viewing Angle Φ

The polar viewing half angle (PVHA) at which the brightness was 70%, 80% and 90% of the axial brightness (AB) was calculated from the modeled data for selected interface angles $\theta_I$ and refractive index differences (N1–N2). These values are represented at Table 2.

TABLE 2

| Polar viewing half angle for selected percentage values of axial brightness | | | | | |
|---|---|---|---|---|---|
| $\theta_I$, degrees | (N1 − N2) | AB, (cd/m2) | PVHA at 90% AB, degrees | PVHA at 80% AB, degrees | PVHA at 70% AB, degrees |
| 0.1 | 0 | 124.48 | 3.6 | 6.7 | 10.3 |
| 0.1 | 0.05 | 126.49 | 22.2 | 22.6 | 23 |
| 0.1 | 0.1 | 126.25 | 26 | 30.6 | 32.3 |
| 1.0 | 0 | 119.85 | 4.7 | 7.8 | 11.1 |
| 1.0 | 0.05 | 133.01 | 21 | 21.3 | 21.6 |
| 1.0 | 0.1 | 132.7 | 22 | 27.9 | 30 |
| 3.0 | 0 | 109.28 | 7.2 | 10.1 | 13 |
| 3.0 | 0.05 | 143.99 | 17.4 | 18.2 | 18.5 |
| 3.0 | 0.1 | 143.72 | 19.1 | 22.5 | 24 |

Preparation and Evaluation of LCFs Using UV Curable Materials

LCFs were made and evaluated according to the procedures described below. The following list of materials was used, except as otherwise noted. Four mixtures of radiation curable resins used in these embodiments are shown in Table 3.

PET (Melinex 618, DuPont Films, Wilmington, Del.)—photograde polyethylene terephthalate; chemically primed on one side.
PC (LEXAN® 8010, GE Polymershapes, Seattle Wash.)—photograde polycarbonate film
SR 285 (Sartomer, Exton Pa.)—tetrahydrofurfuryl acrylate
SR 351 (Sartomer, Exton Pa.)—trimethylolpropane triacrylate (TMPTA)
SR 602 (Sartomer, Exton Pa.)—bisphenol A diacrylate with about four moles of ethoxylation
SR 339 (Sartomer, Exton Pa.)—2-phenoxyethyl acrylate
SR 238 (Sartomer, Exton Pa.)—1,6-hexanediol diacrylate
Photomer 6010 (Cognis, Cincinnati Ohio)—aliphatic urethane diacrylate
Photomer 6210 (Cognis, Cincinnati Ohio)—aliphatic urethane diacrylate
Ebecryl 350 (UCB Chemicals, Smyrna Ga.)—acrylated silicone
9B385 (Penn Color, Doylestown Pa.)—carbon black UV curable paste
SR 9003 (Sartomer, Exton Pa.)—propoxylated (2) neopentyl glycol diacrylate TPO (BASF, Florham Park, N.J.)—Lucirin® TPO photoinitiator
Darocur 1173 (Ciba Specialty Chemicals, Tarrytown N.Y.)—photoinitiator
Irgacure 369 (Ciba Specialty Chemicals, Tarrytown N.Y.)—photoinitiator
Irgacure 819 (Ciba Specialty Chemicals, Tarrytown N.Y.)—photoinitiator

TABLE 3

UV polymerizable resin mixture compositions

| Sample Description | Mixture Compositions (all percentages are by weight) | | | | | Refractive Index[d] |
|---|---|---|---|---|---|---|
| Mixture 1 Low Index "Clear" Resin | 94% Photomer 6010 | 5% SR-285 | 1% Darocur 1173 | — | — | 1.498 (1.488) |
| Mixture 2[a] High Index "Clear" Resin | 45% Photomer 6010 | 36.7% SR-602 | 7.1% SR-238 | 7.1% SR-351 | 4.1% SR-339 | 1.512 (1.496) |
| Mixture 3[b] High Index "Black" Resin | 67% Photomer 6210 | 20% 9B385 | 10% SR-285 | — | — | (1.514) |
| Mixture 4[c] Low Index "Black" Resin | 73% Ebecryl 350 | 15% 9B385 | 5% SR-9003 | 4.5% SR-285 | — | (1.447) |

[a]Mixture 2 had 0.1% TPO and 0.35% Darocur 1173 photoinitiators added.
[b]Mixture 3 had 1% each of Irgaucre 369, Irgacure 819, and Darocur 1173 added.
[c]Mixture 4 had 1.5% Darocur 1173 and 1% Irgacure 819 added.
[d]Calculated refractive index appears in parenthesis, otherwise it was measured.

Refractive Index Determination of Cured Resins

The resins of Mixture 1 and Mixture 2 were separately mixed, and coated between a 0.008 inch (0.20 mm) PC film and an unprimed 0.005 inch PET film using a precision laboratory drawdown coater (manufactured by ChemInstruments) to a thickness of approximately 50 The resulting laminate was cured using UV radiation (1 pass, 25 feet per minute, one-side exposure with two Fusion D bulbs), and the PET coversheet was removed. The refractive index of the photopolymerized resins were measured using a Metricon Model 2010 Prism Coupler System (Metricon Corp, Pennington N.J.) at a wavelength of 633 nm. Due to the presence of the carbon black in Mixtures 3 and 4, this method could not be used for those mixtures.

The calculated refractive index of the resins of Mixtures 1 through 4 were each determined from published refractive index values for each of the individual components at a wavelength of 512 nm. A linear mixing rule was used. The increase in refractive index due to the addition of carbon black added, was 0.009 for every 1% carbon black added by weight to each mixture.

Preparation of Microstructured Films

Microstructured films were made by molding and ultraviolet (UV) light curing the compositions of Mixture 1 and Mixture 2 of Table 3 on either a 0.007 inch (0.178 mm) on primed PET film or a 0.007 inch (0.178 mm) PC film. For these structured films, a cylindrically-shaped metal roll with finely detailed channels cut into its outer surface served as the mold. The resinous mixture was first coated onto either the PET or the PC substrate film, and then pressed firmly against the metal roll in order to completely fill the mold. Upon polymerization the structured film was removed from the mold. The resulting structure in the cured resin was a series of evenly spaced channels, each having a nominally trapezoidal cross-section. The cured resin channels were about 48 microns wide (at their narrowest), about 146 microns deep, and spaced at about a 70 micron pitch. The included wall angle, $\theta_T$, was about 3.6°. FIG. 2 is representative of such a microstructured film.

Preparation of Light Collimating Films

Light collimating films were made by filling the gaps between the transparent channels of the microstructured film using each of the resin compositions of Mixture 3 and Mixture 4 listed in Table 3. Excess black-containing resin was wiped from the surfaces of the transparent channels. The carbon black filled channels were then cured using UV radiation, resulting in a light collimating film similar to that shown in FIG. 3. Each light collimating film was laminated to a 0.008 inch (0.20 mm) PC coversheet film using a UV-curable adhesive (UVX4856 available from Toagosei Co. Ltd, Tokyo, Japan). FIG. 4 is representative of such a light collimating film. The polar viewing cutoff angle $\Phi_P$ for this light collimating film was 60°.

Example 4

A microstructured film was made using the "Mixture 1" low index clear resin composition of Table 3, on PC film as described above. The microstructured film was then filled with the "Mixture 4" low index black resin composition of Table 3, UV cured, and laminated to PC film using the UV curable adhesive and methods described above, to result in a light collimating film.

Example 5

A microstructured film was made using the "Mixture 2" high index clear resin composition of Table 3, on PET film as described above. The microstructured film was then filled with the "Mixture 4" low index black resin composition of Table 3, UV cured, and laminated to PC film using the UV curable adhesive and method described above, to result in a light collimating film.

Comparative Example #1

A microstructured film was made using the "Mixture 1" low index clear resin composition of Table 3, on PC film as described above. The microstructured film was then filled with the "Mixture 3" high index black resin composition of Table 3, UV cured, and laminated to PC film using the UV curable adhesive and method described above, to result in a light collimating film.

Luminance Measurements

An Eldim 80 Conoscope (Eldim Corp, France) was used to measure the luminance (brightness) profiles of a backlight incorporating the LCFs of Example 4, Example 5, and Comparative Example 1. A Sharp 7" TFT LCD module (Model # LQ070T5CRQ1, available from Sharp Electronics, Mahwah N.J.) was modified to include a sheet of Vikuiti™ Brightness Enhancement Film (BEF III-5T, available from 3M Company). Brightness data were taken with the placement of a light collimating film between the BEF and the rear polarizer of the LCD panel (similar to the construction given at FIG. 6). The results from these measurements are shown at Table 4. The axial brightness was the brightness measured perpendicular to the surface of the LCD panel. The polar viewing half angle (PVHA) at which the brightness was 70%, 80% and 90% of the axial brightness (AB) was measured, and the PVHA at which the brightness was 5% of the AB was also measured. The PVHA at 5% of the AB designated a functional polar viewing angle as described elsewhere. A summary of these results are shown at Table 4.

TABLE 4

Axial brightness and polar ½-view angle data of Light Collimating Films

| Sample Description | AB (cd/m$^2$) | PVHA at 90% AB, degrees | PVHA at 80% AB, degrees | PVHA at 70% AB, degrees | PVHA at 5% AB, degrees |
|---|---|---|---|---|---|
| Example 4 | 243 | 8.0 | 11.0 | 13.0 | 30.0 |
| Example 5 | 256 | 8.5 | 13.5 | 16.5 | 32.4 |
| Comparative Example #1 | 192 | 4.0 | 6.5 | 8.5 | 29.6 |

The light collimating films of Example 4 and Comparative Example 1 differ only in the black resin composition and refractive index. The light collimating film of Example 5 used a clear resin that was slightly higher in refractive index than the clear resin used in Example 4.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A collimated lighting assembly, comprising:
    a light control film, comprising:
        a light input surface;
        transmissive and absorptive regions, the transmissive region having an index of refraction N1, and the absorptive region having an index of refraction N2, where N1–N2 is not less than 0.005,
        wherein a first interface between the transmissive region and the absorptive region makes an angle not greater than 3 degrees with a direction perpendicular to the input surface; and
    a light source emitting light toward the light input surface.

2. The collimated lighting assembly of claim 1, further comprising a prismatic film disposed between the light source and the light control film.

3. The collimated lighting assembly of claim 1, further comprising a reflective polarizer disposed between the light source and the light control film.

4. The collimated lighting assembly of claim 3, wherein the reflective polarizer is laminated to the light control film.

5. The collimated lighting assembly of claim 3, further comprising a prismatic film disposed between the light source and the reflective polarizer.

6. The light control film of claim 1, wherein the transmissive region has a second interface with a second absorptive region, and the second interface makes an angle of not greater than 3 degrees with the direction perpendicular to the input surface.

7. A liquid crystal display, comprising:
    a light control film, comprising:
        alternating transmissive and absorptive regions disposed laterally within a plane defined by a light input surface and a light output surface opposite the light input surface, an index of refraction of each absorptive region being less than an index of refraction of each transmissive region by at least 0.005;
        a first interface between a transmissive region and a first adjacent absorptive region defining an interface angle $\theta_1$ measured from a direction perpendicular to the plane of the film, wherein $\theta_1$ is not greater than 3 degrees;
    a light source emitting light toward the light input surface; and
    a liquid crystal display module receiving light from the light output surface.

8. The liquid crystal display of claim 7, further comprising a prismatic film disposed between the light source and the light control film.

9. The liquid crystal display of claim 7, further comprising a reflective polarizer disposed between the light source and the light control film.

10. The liquid crystal display of claim 9, wherein the reflective polarizer is laminated to the light control film.

11. The liquid crystal display of claim 9, further comprising a prismatic film disposed between the light source and the reflective polarizer.

12. The light control film of claim 7, wherein the transmissive region has a second interface with a second adjacent absorptive region, and an interface angle $\theta_2$ defined by the second interface and a direction perpendicular to the light output surface, where $\theta_2$ is not greater than 3 degrees.

* * * * *

UNITED STATES PATENT AND TRADEMARK OFFICE
CERTIFICATE OF CORRECTION

PATENT NO. : 9,804,311 B2
APPLICATION NO. : 15/092033
DATED : October 31, 2017
INVENTOR(S) : Gary Gaides Page 1 of 1

It is certified that error appears in the above-identified patent and that said Letters Patent is hereby corrected as shown below:

In the Specification

<u>Column 13</u>
Line 38 (Approx.), After "50" insert -- μm. --.

Signed and Sealed this
Twenty-fourth Day of July, 2018

Andrei Iancu
*Director of the United States Patent and Trademark Office*